Figure 1:
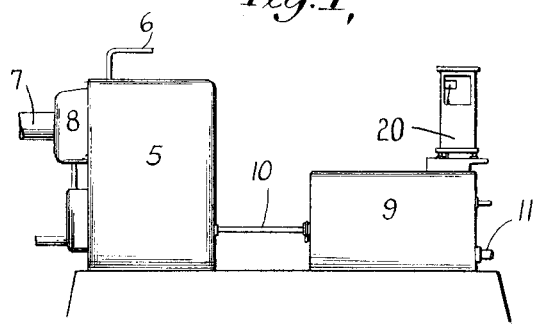

J. W. GAMBLE.
WATER MEASURING APPARATUS.
APPLICATION FILED NOV. 22, 1913.

1,171,035.

Patented Feb. 8, 1916.

WITNESSES
D. McIntosh
H. Nackenhorst

INVENTOR
Joseph W. Gamble
BY
Edmonds & Edmonds
ATTORNEYS

UNITED STATES PATENT OFFICE.

JOSEPH W. GAMBLE, OF PHILADELPHIA, PENNSYLVANIA, ASSIGNOR TO HARRISON SAFETY BOILER WORKS, OF PHILADELPHIA, PENNSYLVANIA, A COPARTNERSHIP.

WATER-MEASURING APPARATUS.

1,171,035.  Specification of Letters Patent.  Patented Feb. 8, 1916.

Application filed November 22, 1913. Serial No. 802,384.

*To all whom it may concern:*

Be it known that I, JOSEPH W. GAMBLE, a citizen of the United States, residing at Philadelphia, in the county of Philadelphia and State of Pennsylvania, have invented certain new and useful Improvements in Water-Measuring Apparatus, of which the following is a specification.

This invention relates to apparatus for measuring water of the character in which the water is measured as it flows over a weir by measuring the head of water with reference to the depth of a notch in the weir.

The invention is of special utility in connection with apparatus of the character disclosed in Patent No. 1,015,556, dated January 23, 1912.

Measuring apparatus of the character to which the present invention relates is commonly employed for measuring water supplied to a steam-generating apparatus and for this purpose may be combined with a feed-water heater for preliminarily heating the water or may be used in conjunction with such a heater though constructed as a wholly separate piece of apparatus. In such apparatus, the measuring devices employed for measuring the water are actuated by a float which is responsive to changes in the level of the water in the chamber on the approach side of the weir. It will be readily appreciated that in such an apparatus, it is of great importance that the water on the approach side of the weir should be free from currents which would disturb its level. For this reason, it has been common heretofore to make apparatus of this character in a form providing three chambers, a down-take chamber, an approach or still-water chamber and an outboard or discharge chamber. Also, in this apparatus as heretofore constructed, it has been considered necessary to make the outboard or discharge chamber of substantial size in order that it will, by reason of its size, modify to some extent fluctuations of the water level in the discharge chamber caused by the time interval which elapses between the passage of water past the inlet valve of the apparatus and the time when this water gets into the outboard chamber.

The present invention involves the provision of certain improvements in the construction of apparatus of this character as heretofore made whereby the construction is materially simplified and whereby the size of the apparatus may be substantially reduced so that a considerable economy in the cost of the apparatus is effected.

In accordance with this invention, the employment of a down-take chamber is eliminated and the inlet water is admitted to the approach chamber, this being made permissible by the provision of means in the approach chamber for suppressing currents of water therein. The inlet water is led to the bottom portion of the approach chamber and is allowed to rise therein and one or more screens are employed in the approach chamber through which the water rises and which serve to prevent any disturbance of the level of the water in the approach chamber. As a result of this change in the construction of the apparatus, a simplification is effected involving the elimination of the down-take chamber. Furthermore, this construction permits of reducing the size of the outboard chamber materially and the cost of manufacture of the apparatus is thus substantially reduced. The present invention also includes certain improvements in the automatic control of the admission of water to the apparatus responsive to changes of the water level within the outboard chamber. In an application for a patent filed by me October 28, 1913, and serially numbered 797,738, I disclosed apparatus of this character whereby the rate of admission of water to the apparatus was automatically increased as the level of the water in the outboard chamber fell between certain limits, whereby the rate of admission of water was maintained substantially constant while the level in the outboard chamber fell between certain lower limits and whereby a further increase in the rate of supply of water would take place when the level of the water in the outboard chamber fell to certain lower limits. The present invention involves a specific form of apparatus for operating in accordance with my application above referred to, this apparatus involving the use of an inlet valve having a valve-member provided with two or more ports which are spaced apart and which are arranged to be opened successively with a time interval between such successive openings as the level of the water in the outboard chamber changes.

I have illustrated the preferred embodiment of my invention in the accompanying drawings, in which—

Figure 2:
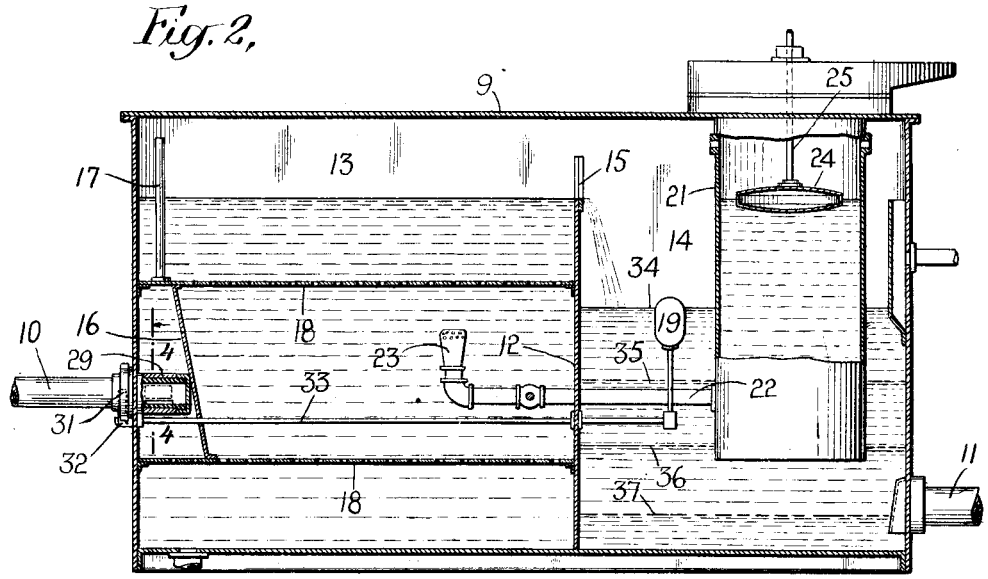
Figure 3:
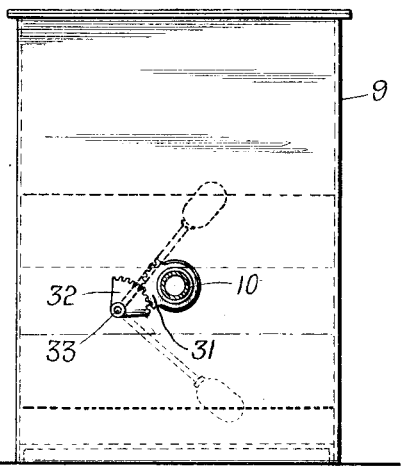
Figure 4:
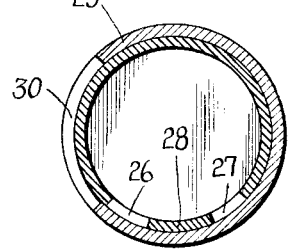

Figure 1 is a diagrammatic view of the measuring apparatus connected to a feed-water heater, Fig. 2 is an enlarged vertical section of the measuring apparatus, Fig. 3 is an elevation of one end of the measuring apparatus and Fig. 4 is a sectional detail view on line 4—4 of Fig. 2.

Referring to these drawings, 5 indicates a feed-water heater for preliminarily heating water to be supplied to a boiler. The water enters the heater 5 through an inlet pipe 6 and steam enters the heater through a steam pipe 7, a separator 8 being inserted between the pipe 7 and heater 5. The measuring apparatus 9 is connected to the heater 5 by a pipe 10 through which water passes from the heater to the measuring apparatus, and water may be drawn off from the measuring apparatus and conveyed to the boiler through pipe 11. The measuring apparatus consists of a receptacle in which is a vertically disposed wall 12 dividing the receptacle into two chambers, an approach or still-water chamber 13 and an outboard or discharge chamber 14. This wall 12 has a notch 15 in the upper edge thereof and it constitutes a weir over which the water flows from the chamber 13 to the chamber 14. The incoming water is admitted to the lower portion of the chamber 13. This is preferably done by providing a hood 16 over the end of the inlet pipe 10 which directs the incoming water downwardly to the bottom portion of the chamber 13. A pipe 17 extends through the hood 16 so as to prevent the accumulation of air under the hood. Within the approach chamber 13 are one or more screens 18, two such screens being shown in the present instance. The water admitted to the apparatus through pipe 10 rises within the approach chamber 13 through the openings in these screens 18 and the screens therefore serve to break up or suppress any currents or swirling of the water caused by the movement of the water through pipe 10 and into the chamber 13. By reason of the provision of these screens 18, the level of the water in chamber 13 will be smooth and therefore the rate of flow of the water over the weir will be a function of the head of water in chamber 13 with respect to the notch of the weir.

The flow of water from inlet pipe 10 into the approach chamber is automatically controlled in response to changes of the level of the water in the discharge chamber 14. For this purpose, a float 19 is provided in chamber 14 and is arranged to govern the admission of water to the apparatus in a manner hereinafter described.

The measurement of the water is effected by a measuring apparatus 20 actuated by a float which rises and falls with the level of the water in the approach chamber 13. For this purpose, a receptacle 21 is provided within chamber 14 and connected by a pipe 22 with the chamber 13. Preferably a strainer 23 is provided upon the end of pipe 22. A float 24 in the receptacle 21 is connected by a rod 25 to the recorder of the measuring apparatus 20, this recorder being arranged to move over a traveling record sheet. The recorder is shown only diagrammatically, as the same is of known construction. Any recorder may be used in which the variations of level of float 24 cause a corresponding record to be marked on a record sheet, the sheet preferably being actuated by clockwork and the marking device moving in any suitable manner, in response to the movement of the float, to form a suitable permanent record of the water level and hence the head of water passing over the weir during the operation of the apparatus.

In supplying water to the apparatus, it is desirable that the rate of supply be increased as the level of the water in the outboard chamber 14 falls. But if this rate of supply be made to vary directly with the water level in the outboard chamber, it will be found that an undesirable fluctuation of the level in chamber 14 takes place and that the record of the supply of water to the steam-generating apparatus is not as accurate as is desirable. In the drawings, I have shown apparatus for modifying the rate of supply of water to the measuring apparatus with respect to the changes in the level of the water in the outboard chamber whereby more accurate results may be obtained. The end of inlet pipe 10 projecting into the approach chamber has two openings 26 and 27 therein spaced apart by the wall 28 and on this end of pipe 10 is a movable valve-member 29 in the form of a sleeve, this sleeve being provided with an opening 30 of a circumferential width equal to or slightly greater than the aggregate width of the openings 26 and 27 and the wall 28. On the movable valve-member 29 is a sector gear 31 meshing with a gear 32 which is secured to the shaft 33 on which the float 19 is mounted. As a result of this construction, the downward movement of the float 19, as the level of the water in chamber 14 falls, will cause opening of the ports 26 and 27 of the valve successively with a substantial interval between the two. The construction is preferably such that as the level of the water in chamber 14 falls from that indicated by the line 34 to that indicated by the line 35, the movable valve-member 29 will be turned so as to open the port 26 more and more, but as the level falls beyond this point from the line 35 to the line 36, the rate of supply of water will not be increased, the port 26 remaining wide open and the port 27 not being open at all by reason of the amount it is spaced from the port 26. When the level of the water falls below that indicated by the line 36, the port 27 will be opened and the extent of its opening will be increased as the level of the water falls to the line 37 when both ports 26 and 27 will be wide open. In this way, the normal supply of water to the measuring apparatus admitted by the port 26 is given ample opportunity to replenish the supply of water in the apparatus after water is drawn off through the pipe 11 and the additional supply of water through the port 27 is brought into action only when water is drawn from the apparatus in such large quantity or at such a high rate that the normal supply of water is insufficient.

Having described my invention, what I claim as new therein and desire to secure by Letters Patent of the United States is:

1. In water measuring apparatus, the combination of a receptacle having an approach and an outboard chamber and a wall between them constituting a weir over which water flows from the approach to the outboard chamber, an inlet pipe connected to the approach chamber, a horizontally disposed screen in the lower part of the approach chamber, means for directing water from said pipe to the space in said approach chamber below said screen, a connection to the outboard chamber for drawing water therefrom, and means for measuring the flow of water over said weir responsive to changes of water lever in the approach chamber, substantially as set forth.

2. In water measuring apparatus, the combination of a receptacle having an approach and an outboard chamber and a wall between them constituting a weir over which water flows from the approach to the outboard chamber, an inlet pipe connected to the approach chamber, a hood within the approach chamber mounted over said inlet to direct water admitted through the inlet pipe to the bottom of the chamber, means for preventing accumulation of air under the hood, means in said approach chamber to suppress swirling of the water as it rises in said chamber, and a pipe for withdrawing air from the outboard chamber, substantially as set forth.

3. The combination of a receptacle, a vertical wall in the receptacle dividing the same into approach and outboard chambers, said wall being notched at its upper edge to form a weir, an inlet pipe connected to the approach chamber, a hood within the approach chamber mounted over said inlet to direct water admitted through the inlet pipe to the bottom of the chamber, a horizontally disposed screen in the approach chamber, water measuring apparatus responsive to changes of water level within the approach chamber, a valve in the inlet pipe, means for controlling said valve responsive to changes of water level in the outboard chamber and a pipe for withdrawing water from the outboard chamber, substantially as set forth.

4. The combination of a receptacle, a wall therein dividing the receptacle into two chambers and forming a weir over which water flows from the first chamber to the second, an inlet pipe connected to the first chamber, a valve therein having a rotatable valve-member, and a coöperating stationary valve-member, a float in the second chamber, connections from the float to the rotatable valve-member for rotating said member as the float is moved, said rotatable and stationary valve-members being provided, one with two ports spaced apart and the other with an opening therethrough of a circumferential length at least equal to the sum of the lengths of the said two ports and the space therebetween, and a measuring apparatus responsive to changes of water level within the first chamber, substantially as set forth.

5. In water measuring apparatus, the combination of a receptacle, a wall therein dividing the receptacle into two chambers and forming a weir over which water flows from the first chamber to the second, an inlet pipe connected to the first chamber, a valve therein comprising a rotary sleeve and a coacting stationary member, one of the same having ports so arranged with respect to a port in the other that as said sleeve is rotated in one direction, water is admitted through said valve at an increasing rate, then for a period at a constant rate, and then at a further increased rate, a float in the second chamber and connections from the float to said sleeve for rotating the latter as the float is moved in response to changes in the level of water in said chamber, substantially as set forth.

6. The combination of a receptacle, a wall therein dividing the receptacle into two chambers and forming a weir over which water flows from the first chamber to the second, an inlet pipe connected to the first chamber, a valve therein having coacting valve-members, one of the same being rotatable with respect to the other, a float in the second chamber, connections from the float to the rotatable one of said valve-members for moving the latter as the float is moved, one of said valve-members having two ports therein spaced apart so as to open successively as the valve is operated and a measuring apparatus responsive to changes of water level within the first chamber, substantially as set forth.

This specification signed and witnessed this 21st day of November, 1913.

JOSEPH W. GAMBLE.

Witnesses:
D. S. EDMONDS,
I. MCINTOSH.

Copies of this patent may be obtained for five cents each, by addressing the "Commissioner of Patents, Washington, D. C."

Correction in Letters Patent No. 1,171,035.

It is hereby certified that in Letters Patent No. 1,171,035, granted February 8, 1916, upon the application of Joseph W. Gamble, of Philadelphia, Pennsylvania, for an improvement in "Water-Measuring Apparatus," an error appears in the printed specification requiring correction as follows: Page 3, line 51, claim 1, for the word "lever" read *level;* and that the said Letters Patent should be read with this correction therein that the same may conform to the record of the case in the Patent Office.

Signed and sealed this 29th day of February, A. D., 1916.

[SEAL.]

R. F. WHITEHEAD,
*Acting Commissioner of Patents.*

Cl. 73—167.